(12) United States Patent
Wells (10) Patent No.: US 9,116,543 B2
(45) Date of Patent: *Aug. 25, 2015

(54) VIRTUAL INPUT SYSTEM

(71) Applicant: III Holdings 1, LLC, Wilmington, DE (US)

(72) Inventor: William R. Wells, Reno, NV (US)

(73) Assignee: III Holdings 1, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/158,013

(22) Filed: Jan. 17, 2014

(65) Prior Publication Data

US 2014/0132509 A1 May 15, 2014

Related U.S. Application Data (63) Continuation of application No. 13/618,910, filed on Sep. 14, 2012, now Pat. No. 8,668,584, which is a continuation of application No. 13/077,606, filed on Mar. 31, 2011, now Pat. No. 8,398,488, which is a continuation of application No. 10/921,518, filed on Aug. 19, 2004, now Pat. No. 7,942,744.

(51) Int. Cl.
*A63F 13/06* (2006.01)
*G06F 3/01* (2006.01)
*G01S 13/56* (2006.01)
(Continued)

(52) U.S. Cl.
CPC . *G06F 3/01* (2013.01); *G01S 13/56* (2013.01); *G01S 13/862* (2013.01); *G01S 15/025* (2013.01); *G01S 15/87* (2013.01); *G01S 15/88* (2013.01); *G01S 17/89* (2013.01); *G06F 3/0346* (2013.01);

(Continued)

(58) Field of Classification Search
CPC ......... G06F 3/016; G06F 3/011; A63F 13/06; A63F 2300/1062; A63F 13/10
USPC ................... 345/156, 158; 463/36, 37, 25, 42
See application file for complete search history.

(56) References Cited

U.S. PATENT DOCUMENTS

| | | | |
|---|---|---|---|
| 3,662,105 A | 5/1972 | Parks et al. | |
| 3,697,698 A | 10/1972 | Oswald et al. | |

(Continued)

FOREIGN PATENT DOCUMENTS

| | | |
|---|---|---|
| AU | 704691 B2 | 4/1997 |
| AU | 2005265179 | 1/2011 |

(Continued)

OTHER PUBLICATIONS

U.S. Office Action from U.S. Appl. No. 11/825,481, dated Nov. 24, 2010.

(Continued)

*Primary Examiner* — Pierre E Elisca
(74) *Attorney, Agent, or Firm* — Christensen O'Connor Johnson Kindness PLLC (57) ABSTRACT

For a user having a user input actuator, a virtual interface device, such as for a gaming machine, for determining actuation of a virtual input by the input actuator is disclosed. The device comprises a position sensing device for determining a location of the user input actuator and a controller coupled to the position sensing device, the controller determining whether a portion of the user input actuator is within a virtual input location in space defining the virtual input.

20 Claims, 7 Drawing Sheets

(51) Int. Cl.

| | | |
|---|---|---|
| G01S 15/02 | (2006.01) | |
| G01S 15/87 | (2006.01) | |
| G01S 15/88 | (2006.01) | |
| G01S 17/89 | (2006.01) | |
| G06F 3/0346 | (2013.01) | |
| G06F 3/042 | (2006.01) | |
| G07F 17/32 | (2006.01) | |
| G01S 13/86 | (2006.01) | |
| G01S 13/34 | (2006.01) | |

(52) U.S. Cl.
CPC .......... *G06F 3/0421* (2013.01); *G07F 17/3211* (2013.01); *G01S 13/34* (2013.01)

(56) References Cited

U.S. PATENT DOCUMENTS

| | | |
|---|---|---|
| 3,724,932 A | 4/1973 | Cornsweet et al. |
| 3,986,030 A | 10/1976 | Teltscher |
| 4,071,689 A | 1/1978 | Talmage |
| 4,072,930 A | 2/1978 | Lucero et al. |
| 4,109,145 A | 8/1978 | Graf |
| 4,283,709 A | 8/1981 | Lucero et al. |
| 4,339,798 A | 7/1982 | Hedges et al. |
| 4,348,696 A | 9/1982 | Beier |
| 4,553,222 A | 11/1985 | Kurland et al. |
| 4,595,990 A | 6/1986 | Garwin |
| 4,836,670 A | 6/1989 | Hutchinson |
| 4,837,728 A | 6/1989 | Barrie et al. |
| 4,856,787 A | 8/1989 | Itkis et al. |
| 4,950,069 A | 8/1990 | Hutchinson |
| 4,973,149 A | 11/1990 | Hutchinson |
| 5,033,744 A | 7/1991 | Bridgeman et al. |
| 5,038,022 A | 8/1991 | Lucero et al. |
| 5,042,809 A | 8/1991 | Richardson et al. |
| 5,048,831 A | 9/1991 | Sides |
| 5,059,959 A | 10/1991 | Barry |
| 5,116,055 A | 5/1992 | Tracy et al. |
| 5,179,517 A | 1/1993 | Sarbin et al. |
| 5,280,809 A | 1/1994 | Tive et al. |
| 5,288,078 A | 2/1994 | Capper et al. |
| 5,367,315 A | 11/1994 | Pan |
| 5,371,345 A | 12/1994 | LeStrange et al. |
| 5,429,361 A | 7/1995 | Raven et al. |
| 5,442,168 A | 8/1995 | Gurner et al. |
| 5,470,079 A | 11/1995 | LeStrange et al. |
| 5,474,082 A | 12/1995 | Junker |
| 5,517,021 A | 5/1996 | Kaufman et al. |
| 5,536,016 A | 7/1996 | Thompson |
| 5,577,731 A | 11/1996 | Jones et al. |
| 5,605,334 A | 2/1997 | McCrea et al. |
| 5,616,078 A | 4/1997 | Oh |
| 5,618,045 A | 4/1997 | Kagan |
| 5,638,826 A | 6/1997 | Wolpaw et al. |
| 5,643,086 A | 7/1997 | Alcorn et al. |
| 5,655,961 A | 8/1997 | Acres et al. |
| 5,655,966 A | 8/1997 | Werdin, Jr. et al. |
| 5,702,304 A | 12/1997 | Acres et al. |
| 5,704,836 A | 1/1998 | Norton et al. |
| 5,716,273 A | 2/1998 | Yuen |
| 5,718,632 A | 2/1998 | Hayashi |
| 5,741,183 A | 4/1998 | Acres et al. |
| 5,759,102 A | 6/1998 | Pease et al. |
| 5,761,647 A | 6/1998 | Boushy |
| 5,766,076 A | 6/1998 | Pease et al. |
| 5,768,382 A | 6/1998 | Schneier et al. |
| 5,769,716 A | 6/1998 | Saffari et al. |
| 5,770,533 A | 6/1998 | Franchi et al. |
| 5,779,545 A | 7/1998 | Berg et al. |
| 5,788,573 A | 8/1998 | Baerlocher et al. |
| 5,795,228 A | 8/1998 | Trumbull et al. |
| 5,796,389 A | 8/1998 | Bertram et al. |
| 5,797,085 A | 8/1998 | Beuk et al. |
| 5,803,809 A | 9/1998 | Yoseloff |
| 5,809,482 A | 9/1998 | Strisower |
| 5,811,772 A | 9/1998 | Lucero et al. |
| 5,816,918 A | 10/1998 | Kelly et al. |
| 5,818,954 A | 10/1998 | Tomono et al. |
| 5,833,536 A | 11/1998 | Davids et al. |
| 5,833,540 A | 11/1998 | Miodunski et al. |
| 5,844,824 A | 12/1998 | Newman et al. |
| 5,851,148 A | 12/1998 | Brune et al. |
| 5,855,515 A | 1/1999 | Pease et al. |
| 5,871,398 A | 2/1999 | Schneier et al. |
| 5,885,158 A | 3/1999 | Torango et al. |
| 5,892,566 A | 4/1999 | Bullwinkel |
| 5,910,048 A | 6/1999 | Feinberg |
| 5,913,727 A | 6/1999 | Ahdoot |
| 5,919,091 A | 7/1999 | Bell et al. |
| 5,951,397 A | 9/1999 | Dickinson |
| 5,954,583 A | 9/1999 | Green et al. |
| 5,957,776 A | 9/1999 | Hoehne et al. |
| 5,967,896 A | 10/1999 | Jorasch et al. |
| 5,971,271 A | 10/1999 | Wynn et al. |
| 5,982,326 A | 11/1999 | Chow et al. |
| 5,984,779 A | 11/1999 | Bridgeman et al. |
| 5,999,808 A | 12/1999 | Laude et al. |
| 6,001,016 A | 12/1999 | Walker et al. |
| 6,003,013 A | 12/1999 | Boushy et al. |
| 6,003,651 A | 12/1999 | Waller et al. |
| 6,008,800 A | 12/1999 | Pryor |
| 6,010,404 A | 1/2000 | Walker et al. |
| 6,012,832 A | 1/2000 | Saunders et al. |
| 6,012,983 A | 1/2000 | Walker et al. |
| 6,038,666 A | 3/2000 | Hsu et al. |
| 6,048,269 A | 4/2000 | Burns et al. |
| 6,050,895 A | 4/2000 | Luciano et al. |
| 6,062,981 A | 5/2000 | Luciano |
| 6,068,552 A | 5/2000 | Walker et al. |
| 6,077,163 A | 6/2000 | Walker et al. |
| 6,089,975 A | 7/2000 | Dunn |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,110,043 A | 8/2000 | Olsen |
| 6,113,492 A | 9/2000 | Walker et al. |
| 6,113,493 A | 9/2000 | Walker et al. |
| 6,113,495 A | 9/2000 | Walker et al. |
| 6,135,884 A | 10/2000 | Hedrick et al. |
| 6,135,887 A | 10/2000 | Pease et al. |
| 6,139,431 A | 10/2000 | Walker et al. |
| 6,142,876 A | 11/2000 | Cumbers et al. |
| 6,146,273 A | 11/2000 | Olsen et al. |
| 6,149,522 A | 11/2000 | Alcorn et al. |
| 6,161,059 A | 12/2000 | Tedesco et al. |
| 6,162,121 A | 12/2000 | Morro et al. |
| 6,162,122 A | 12/2000 | Acres et al. |
| 6,168,522 B1 | 1/2001 | Walker et al. |
| 6,174,234 B1 | 1/2001 | Seibert, Jr. et al. |
| 6,182,221 B1 | 1/2001 | Hsu et al. |
| 6,183,362 B1 | 2/2001 | Boushy |
| 6,190,256 B1 | 2/2001 | Walker et al. |
| 6,191,773 B1 | 2/2001 | Maruno et al. |
| 6,210,279 B1 | 4/2001 | Dickinson |
| 6,227,972 B1 | 5/2001 | Walker et al. |
| 6,227,974 B1 | 5/2001 | Eilat et al. |
| 6,234,900 B1 | 5/2001 | Cumbers |
| 6,244,958 B1 | 6/2001 | Acres |
| 6,247,643 B1 | 6/2001 | Lucero |
| 6,253,119 B1 | 6/2001 | Dabrowski |
| 6,264,560 B1 | 7/2001 | Goldberg et al. |
| 6,264,561 B1 | 7/2001 | Saffari et al. |
| 6,267,671 B1 | 7/2001 | Hogan |
| 6,270,410 B1 | 8/2001 | DeMar et al. |
| 6,280,328 B1 | 8/2001 | Holch et al. |
| 6,285,868 B1 | 9/2001 | LaDue |
| 6,293,866 B1 | 9/2001 | Walker et al. |
| 6,302,790 B1 | 10/2001 | Brossard |
| 6,307,956 B1 | 10/2001 | Black |
| 6,313,871 B1 | 11/2001 | Schubert |
| 6,319,125 B1 | 11/2001 | Acres |
| 6,341,353 B1 | 1/2002 | Herman et al. |
| 6,346,044 B1 | 2/2002 | McCrea, Jr. |

(56) References Cited

U.S. PATENT DOCUMENTS

| | | |
|---|---|---|
| 6,368,216 B1 | 4/2002 | Hedrick et al. |
| 6,371,852 B1 | 4/2002 | Acres |
| 6,375,572 B1 | 4/2002 | Masuyama et al. |
| 6,379,246 B1 | 4/2002 | Dabrowski |
| 6,383,076 B1 | 5/2002 | Tiedeken |
| 6,409,595 B1 | 6/2002 | Uihlein et al. |
| 6,409,602 B1 | 6/2002 | Wiltshire et al. |
| 6,439,993 B1 | 8/2002 | O'Halloran |
| 6,443,843 B1 | 9/2002 | Walker et al. |
| 6,450,885 B2 | 9/2002 | Schneier et al. |
| 6,471,591 B1 | 10/2002 | Crumby |
| 6,488,585 B1 | 12/2002 | Wells et al. |
| 6,508,710 B1 | 1/2003 | Paravia et al. |
| 6,511,376 B2 | 1/2003 | Walker et al. |
| 6,511,377 B1 | 1/2003 | Weiss |
| 6,519,607 B1 | 2/2003 | Mahoney et al. |
| 6,530,835 B1 | 3/2003 | Walker et al. |
| 6,554,705 B1 | 4/2003 | Cumbers |
| 6,561,903 B2 | 5/2003 | Walker et al. |
| 6,582,310 B1 | 6/2003 | Walker et al. |
| 6,585,592 B1 | 7/2003 | Crumby |
| 6,599,193 B2 | 7/2003 | Baerlocher et al. |
| 6,607,443 B1 | 8/2003 | Miyamoto et al. |
| 6,611,253 B1 | 8/2003 | Cohen |
| 6,620,047 B1 | 9/2003 | Alcorn et al. |
| 6,624,561 B2 | 9/2003 | Nakamura et al. |
| 6,628,939 B2 | 9/2003 | Paulsen |
| 6,629,890 B2 | 10/2003 | Johnson |
| 6,637,883 B1 | 10/2003 | Tengshe et al. |
| 6,645,077 B2 | 11/2003 | Rowe |
| 6,645,078 B1 | 11/2003 | Mattice |
| 6,650,318 B1 | 11/2003 | Arnon |
| 6,651,985 B2 | 11/2003 | Sines et al. |
| 6,652,378 B2 | 11/2003 | Cannon et al. |
| 6,676,522 B2 | 1/2004 | Rowe et al. |
| 6,682,421 B1 | 1/2004 | Rowe et al. |
| 6,685,480 B2 | 2/2004 | Nishimoto et al. |
| 6,685,567 B2 | 2/2004 | Cockerille et al. |
| 6,712,698 B2 | 3/2004 | Paulsen et al. |
| 6,720,949 B1 | 4/2004 | Pryor et al. |
| 6,722,985 B2 | 4/2004 | Criss-Puszkiewicz et al. |
| 6,739,975 B2 | 5/2004 | Nguyen et al. |
| 6,743,097 B2 | 6/2004 | Walker et al. |
| 6,776,715 B2 | 8/2004 | Price |
| 6,783,459 B2 | 8/2004 | Cumbers |
| 6,800,029 B2 | 10/2004 | Rowe et al. |
| 6,801,188 B2 | 10/2004 | Longobardi |
| 6,804,763 B1 | 10/2004 | Stockdale et al. |
| 6,830,515 B2 | 12/2004 | Rowe |
| 6,846,238 B2 | 1/2005 | Wells |
| 6,852,031 B1 | 2/2005 | Rowe |
| 6,863,608 B1 | 3/2005 | LeMay |
| 6,863,609 B2 | 3/2005 | Okuda et al. |
| 6,866,586 B2 | 3/2005 | Oberberger |
| 6,884,170 B2 | 4/2005 | Rowe |
| 6,908,387 B2 | 6/2005 | Hedrick et al. |
| 6,921,332 B2 | 7/2005 | Fukunaga et al. |
| 6,922,276 B2 | 7/2005 | Zhang et al. |
| 6,939,231 B2 | 9/2005 | Mäntyjärvi et al. |
| 6,965,868 B1 | 11/2005 | Bednarek |
| 6,997,807 B2 | 2/2006 | Weiss |
| 7,001,277 B2 | 2/2006 | Walker et al. |
| 7,022,017 B1 | 4/2006 | Halbritter et al. |
| 7,035,626 B1 | 4/2006 | Luciano, Jr. |
| 7,083,518 B2 | 8/2006 | Rowe |
| 7,111,141 B2 | 9/2006 | Nelson |
| 7,112,138 B2 | 9/2006 | Hedrick et al. |
| 7,128,651 B2 | 10/2006 | Miyamoto et al. |
| 7,168,089 B2 | 1/2007 | Nguyen et al. |
| 7,217,190 B2 | 5/2007 | Weiss |
| 7,255,642 B2 | 8/2007 | Sines et al. |
| 7,275,991 B2 | 10/2007 | Burns et al. |
| 7,384,339 B2 | 6/2008 | LeMay et al. |
| 7,515,718 B2 | 4/2009 | Nguyen et al. |
| 7,611,407 B1 | 11/2009 | Itkis et al. |
| 7,815,507 B2 | 10/2010 | Parrott et al. |
| 7,942,744 B2 | 5/2011 | Wells |
| 2001/0000118 A1 | 4/2001 | Sines et al. |
| 2001/0028147 A1 | 10/2001 | Ornstein et al. |
| 2001/0031663 A1 | 10/2001 | Johnson |
| 2001/0039204 A1 | 11/2001 | Tanskanen |
| 2001/0040572 A1 | 11/2001 | Bradski |
| 2002/0002072 A1 | 1/2002 | Sines et al. |
| 2002/0022518 A1 | 2/2002 | Okuda et al. |
| 2002/0036617 A1 | 3/2002 | Pryor |
| 2002/0042297 A1 | 4/2002 | Torango |
| 2002/0046100 A1 | 4/2002 | Kinjo |
| 2002/0055383 A1 | 5/2002 | Onda |
| 2002/0075240 A1* | 6/2002 | Lieberman et al. ............ 345/170 |
| 2002/0098888 A1 | 7/2002 | Rowe et al. |
| 2002/0103024 A1 | 8/2002 | Jeffway, Jr. et al. |
| 2002/0103027 A1 | 8/2002 | Rowe et al. |
| 2002/0107066 A1 | 8/2002 | Seelig et al. |
| 2002/0133418 A1 | 9/2002 | Hammond et al. |
| 2002/0142824 A1 | 10/2002 | Kazaoka et al. |
| 2002/0142825 A1 | 10/2002 | Lark et al. |
| 2002/0142844 A1 | 10/2002 | Kerr |
| 2002/0142846 A1 | 10/2002 | Paulsen |
| 2002/0147047 A1 | 10/2002 | Letovsky et al. |
| 2002/0198052 A1 | 12/2002 | Soltys et al. |
| 2003/0003988 A1 | 1/2003 | Walker et al. |
| 2003/0017872 A1 | 1/2003 | Oishi et al. |
| 2003/0027632 A1 | 2/2003 | Sines et al. |
| 2003/0032485 A1 | 2/2003 | Cockerille et al. |
| 2003/0045354 A1 | 3/2003 | Giobbi |
| 2003/0050806 A1 | 3/2003 | Friesen et al. |
| 2003/0054881 A1 | 3/2003 | Hedrick et al. |
| 2003/0060280 A1 | 3/2003 | Oles et al. |
| 2003/0069071 A1 | 4/2003 | Britt et al. |
| 2003/0078101 A1 | 4/2003 | Schneider et al. |
| 2003/0078103 A1 | 4/2003 | LeMay et al. |
| 2003/0083132 A1 | 5/2003 | Berg et al. |
| 2003/0083943 A1 | 5/2003 | Adams et al. |
| 2003/0100361 A1 | 5/2003 | Sharpless et al. |
| 2003/0109308 A1 | 6/2003 | Rowe |
| 2003/0148808 A1 | 8/2003 | Price |
| 2003/0148812 A1 | 8/2003 | Paulsen et al. |
| 2003/0162593 A1 | 8/2003 | Griswold |
| 2003/0179229 A1 | 9/2003 | Van Erlach et al. |
| 2003/0190944 A1 | 10/2003 | Manfredi et al. |
| 2003/0203756 A1 | 10/2003 | Jackson |
| 2003/0228898 A1 | 12/2003 | Rowe |
| 2004/0001182 A1 | 1/2004 | Dyner |
| 2004/0002386 A1 | 1/2004 | Wolfe et al. |
| 2004/0027450 A1 | 2/2004 | Yoshino |
| 2004/0029635 A1 | 2/2004 | Giobbi |
| 2004/0043814 A1 | 3/2004 | Angell et al. |
| 2004/0046736 A1 | 3/2004 | Pryor et al. |
| 2004/0053675 A1 | 3/2004 | Nguyen et al. |
| 2004/0063480 A1 | 4/2004 | Wang |
| 2004/0063481 A1 | 4/2004 | Wang |
| 2004/0082385 A1 | 4/2004 | Silva et al. |
| 2004/0085293 A1 | 5/2004 | Soper |
| 2004/0087370 A1 | 5/2004 | Tarantino |
| 2004/0092310 A1 | 5/2004 | Brosnan et al. |
| 2004/0116174 A1 | 6/2004 | Baerlocher et al. |
| 2004/0127277 A1 | 7/2004 | Walker et al. |
| 2004/0137987 A1 | 7/2004 | Nguyen et al. |
| 2004/0147314 A1 | 7/2004 | LeMay et al. |
| 2004/0162139 A1 | 8/2004 | Blanco |
| 2004/0166937 A1 | 8/2004 | Rothschild et al. |
| 2004/0189720 A1 | 9/2004 | Wilson et al. |
| 2004/0193413 A1 | 9/2004 | Wilson et al. |
| 2004/0199284 A1 | 10/2004 | Hara |
| 2004/0203895 A1 | 10/2004 | Balasuriya |
| 2004/0251630 A1 | 12/2004 | Sines et al. |
| 2004/0254006 A1 | 12/2004 | Lam et al. |
| 2005/0037844 A1 | 2/2005 | Shum et al. |
| 2005/0059488 A1 | 3/2005 | Larsen et al. |
| 2005/0076242 A1 | 4/2005 | Breuer |
| 2005/0143169 A1 | 6/2005 | Nguyen et al. |
| 2005/0212753 A1 | 9/2005 | Marvit et al. |
| 2005/0255911 A1 | 11/2005 | Nguyen et al. |
| 2005/0255922 A1 | 11/2005 | Nguyen et al. |

(56) References Cited

U.S. PATENT DOCUMENTS

| | | |
|---|---|---|
| 2005/0261059 A1 | 11/2005 | Nguyen et al. |
| 2005/0261060 A1 | 11/2005 | Nguyen et al. |
| 2005/0261061 A1 | 11/2005 | Nguyen et al. |
| 2005/0261816 A1 | 11/2005 | DiCroce et al. |
| 2005/0273815 A1 | 12/2005 | Orr et al. |
| 2005/0282603 A1 | 12/2005 | Parrott et al. |
| 2006/0036874 A1 | 2/2006 | Cockerille et al. |
| 2006/0040730 A1 | 2/2006 | Walker et al. |
| 2006/0040739 A1 | 2/2006 | Wells |
| 2006/0052109 A1 | 3/2006 | Ashman et al. |
| 2006/0058091 A1 | 3/2006 | Crawford et al. |
| 2006/0073888 A1 | 4/2006 | Nguyen et al. |
| 2006/0079333 A1 | 4/2006 | Morrow et al. |
| 2006/0189365 A1 | 8/2006 | Crawford et al. |
| 2006/0189367 A1 | 8/2006 | Nguyen et al. |
| 2006/0189382 A1 | 8/2006 | Muir et al. |
| 2006/0189384 A1 | 8/2006 | Crawford et al. |
| 2006/0252530 A1 | 11/2006 | Oberberger et al. |
| 2007/0004510 A1 | 1/2007 | Underdahl et al. |
| 2007/0021198 A1 | 1/2007 | Muir et al. |
| 2007/0052636 A1 | 3/2007 | Kalt et al. |
| 2007/0202952 A1 | 8/2007 | Francis et al. |
| 2007/0259716 A1 | 11/2007 | Mattice et al. |
| 2007/0259717 A1 | 11/2007 | Mattice et al. |
| 2007/0298873 A1 | 12/2007 | Nguyen et al. |
| 2008/0076505 A1 | 3/2008 | Nguyen et al. |
| 2008/0076506 A1 | 3/2008 | Nguyen et al. |
| 2008/0146344 A1 | 6/2008 | Rowe et al. |
| 2009/0069090 A1 | 3/2009 | Moser et al. |
| 2009/0098925 A1 | 4/2009 | Gagner et al. |
| 2009/0280910 A1 | 11/2009 | Gagner et al. |
| 2009/0325686 A1 | 12/2009 | Davis et al. |
| 2010/0087241 A1 | 4/2010 | Nguyen et al. |
| 2010/0255902 A1 | 10/2010 | Goldstein et al. |
| 2011/0065490 A1 | 3/2011 | Lutnick |
| 2011/0212778 A1 | 9/2011 | Wells |
| 2011/0275432 A1 | 11/2011 | Lutnick et al. |

FOREIGN PATENT DOCUMENTS

| | | |
|---|---|---|
| CN | 1969301 | 5/2007 |
| DE | 10034275 A1 | 1/2002 |
| EP | 0698858 A1 | 2/1996 |
| EP | 0744786 A1 | 11/1996 |
| EP | 0769769 A1 | 4/1997 |
| EP | 0924657 A1 | 6/1999 |
| EP | 0942285 | 9/1999 |
| EP | 1120757 | 8/2001 |
| EP | 1231577 A2 | 8/2002 |
| EP | 1482459 A2 | 12/2004 |
| EP | 1494182 A2 | 1/2005 |
| GB | 2284913 A | 6/1995 |
| GB | 2429564 | 2/2007 |
| JP | 2001/218982 A | 8/2001 |
| JP | 2003-181137 A | 7/2003 |
| JP | 2004-113755 | 4/2004 |
| JP | 07299248 A | 11/2007 |
| WO | WO 95/24689 A1 | 9/1995 |
| WO | WO 96/00950 A1 | 1/1996 |
| WO | WO 98/50876 A1 | 11/1998 |
| WO | WO 98/58509 A1 | 12/1998 |
| WO | 99/07153 | 2/1999 |
| WO | WO 99/10061 A1 | 3/1999 |
| WO | WO 01/00291 A1 | 1/2001 |
| WO | WO 01/01379 A1 | 1/2001 |
| WO | WO 01/03786 A1 | 1/2001 |
| WO | WO 01/27759 A2 | 4/2001 |
| WO | WO 01/48712 A1 | 7/2001 |
| WO | WO 01/76710 A2 | 10/2001 |
| WO | WO 02/24288 A2 | 3/2002 |
| WO | 02/050652 | 6/2002 |
| WO | WO 02/055163 A2 | 7/2002 |
| WO | WO 02/058020 A2 | 7/2002 |
| WO | WO 03/019486 A2 | 3/2003 |
| WO | WO 03/084623 A1 | 10/2003 |
| WO | 2004/025595 | 3/2004 |
| WO | 2004/034905 | 4/2004 |
| WO | WO 2004/027584 A2 | 4/2004 |
| WO | WO 2004/056432 A2 | 7/2004 |
| WO | WO 2004/070591 A1 | 8/2004 |
| WO | 2005/023389 | 3/2005 |
| WO | 2006/010011 | 1/2006 |
| WO | WO 2006/009917 A1 | 1/2006 |
| WO | 2006/023285 | 3/2006 |
| WO | 2006/090197 | 8/2006 |
| WO | 2008/028148 | 3/2008 |
| WO | 2008/030777 | 3/2008 |
| WO | 2009/009225 | 1/2009 |
| WO | WO 2009/009224 A1 | 1/2009 |

OTHER PUBLICATIONS

U.S. Office Action from U.S. Appl. No. 11/825,477, dated Nov. 15, 2010.

U.S. Restriction Requirement from U.S. Appl. No. 10/921,518, dated Nov. 15, 2007.

U.S. Office Action from U.S. Appl. No. 10/921,518, dated Mar. 17, 2008.

U.S. Restriction Requirement from U.S. Appl. No. 10/921,518, dated Nov. 21, 2008.

U.S. Final Office Action from U.S. Appl. No. 10/921,518, dated Apr. 20, 2010.

U.S. Notice of Allowance from U.S. Appl. No. 10/921,518, dated Oct. 21, 2010.

U.S. Notice of Allowance from U.S. Appl. No. 10/921,518, dated Feb. 2, 2011.

Australian Office Action from Application Serial No. 2005265179, dated Jan. 28, 2010.

Chinese Office Action from Application No. 200580020194.0, dated Apr. 3, 2009.

Chinese Office Action from Application No. 200580020194.0, dated Aug. 5, 2010.

British Examination Report from Application No. 0625344.7, dated Oct. 5, 2007.

British Examination Report from Application 0625344.7, dated Sep. 12, 2008.

International Preliminary Report on Patentability from Application No. PCT/US2005/021605, dated Dec. 20, 2006.

International Search Report from Application No. PCT/US2005/021605, dated Sep. 29, 2005.

Written Opinion from Application No. PCT/US2005/021605, dated Sep. 29, 2005.

International Preliminary Report on Patentability from Application No. PCT/US2008/064779, dated Jan. 12, 2010.

International Search Report from Application No. PCT/US2008/064779 dated Sep. 30, 2008.

Written Opinion from Application Serial No. PCT/US2008/064779 dated Sep. 30, 2008.

International Preliminary Report on Patentability from Application Serial No. PCT/US2008/064776, dated Jan. 12, 2010.

International Search Report from Application Serial No. PCT/US2008/064776, dated Sep. 29, 2008.

Written Opinion from Serial Application No. PCT/US2008/064776, dated Sep. 29, 2008.

International Preliminary Report on Patentability dated Feb. 20, 2007 from Application No. PCT/US2005/027731.

International Search Report, dated Jan. 16, 2006, from corresponding International Application No. PCT/US2005/027731, 7 pp. including Notification of Transmittal.

Written Opinion of the International Searching Authority, dated Jan. 16, 2006, from corresponding International Application No. PCT/US2005/027731, 10 pp.

"CHI97: The Magic Carpet; Physical Sensing for Immersive Environments", website, http://www.acm.org/sigchi/chi97/proceedings/short-demo/jp.htm, 5 pages, Nov. 8, 2004.

Paradiso, "Several Sensor Approaches that Retrofit Large Surfaces for Interactivity", ACM Ubicomp 2002 Workshop on Collaboration with Interactive Walls and Tables, Gothenburg, Sweden, Sep. 29, 2002, 8 pages.

(56) References Cited

OTHER PUBLICATIONS

Canesta, Inc., "Getting Started With Canesta, Device Prototyping Program" Copyright 2002, Canesta, Inc., 1 page document. http"//www.canesta.com/devtools.htm.

Dean, Katie, "Wired News: Gesture Your Mouse Goodbye" May 28, 2003 2 pages, http://www.wired.com/new/gizmos/0,1452,58978,00.html.

LC Technologies, Inc., 4 page document entitled "Eyeglaze Technology, Solutions and Applications" Copyright 2003, http://www.eyegaze.com/Solutions.htm.

LC Technologies, Inc., 9 page document entitled "The Eyegaze Analysis System, Research Tools" Copyright 2003, http://www.eyegaze.com/2Products/Development/Devlopmentrnain.htm.

Townsend, J. Eric et al., 11 page document entitled "Mattel Power Glove FAQ version 0.1, May 7, 1993" http://www.ccs.new.edu/home/ivan/pglove/faq-0.1.html.

U.S. Final Office Action from U.S. Appl. No. 11/825,481, dated May 3, 2011.

U.S. Final Office Action from U.S. Appl. No. 11/825,477, dated Apr. 19, 2011.

Canadian Office Action from Application Serial No. 2,570,901, dated May 18, 2011.

Canadian Office Action from Application Serial No. 2,570,901, dated May 3, 2012.

Third Party Submission for U.S. Appl. No. 13/077,606, filed Oct. 31, 2011.

U.S. Notice of Allowance from U.S. Appl. No. 13/077,606, dated Apr. 4, 2012.

U.S. Notice of Allowance from U.S. Appl. No. 13/077,606, dated Jul. 11, 2012.

Notice of Allowance dated Oct. 1, 2012, in U.S. Appl. No. 11/825,477, filed Jul. 6, 2007, 25 pages.

\* cited by examiner

VIRTUAL INPUT SYSTEM

PRIORITY CLAIM

This application is a continuation of, and claims priority to and the benefit of, U.S. patent application Ser. No. 13/618,910, filed on Sep. 14, 2012, which is a continuation of, and claims priority to and the benefit of, U.S. patent application Ser. No. 13/077,606, filed on Mar. 31, 2011, which issued as U.S. Pat. No. 8,398,488 on Mar. 19, 2013, which is a continuation of, and claims priority to and the benefit of, U.S. patent application Ser. No. 10/921,518, filed on Aug. 19, 2004, which issued as U.S. Pat. No. 7,942,744 on May 17, 2011, the entire contents of each of which are incorporated herein by reference.

TECHNICAL HELD

The present invention relates to a system for providing a virtual input, such as for an electronic gaming machine.

BACKGROUND OF THE INVENTION

Player interaction with a gaming machine is typically limited to touching a touch screen sensor or depressing an electro-mechanical switch. A touch screen sensor usually fits the shape and size of an associated active display, such as an LCD or a CRT.

A typical gaming touch screen assembly consists of a touch screen sensor attached to the front surface of an active display device, such as a CRT or an LCD. The sensor is connected to a touch screen controller, which sends touch position data to the game controller. The basic sensor material is typically plastic or glass and requires a transparent conductive oxide (TCO) layer, such as Indium Tin Oxide (ITO), wires or acoustic components to work. The specifics depend on the type of touch screen technology (capacitive, resistive, acoustic and near-field).

The sensor surfaces are typically flat, but could be slightly curved, such as for example CRT's. All of these conventional sensor technologies have limitations when dealing with large surface sizes, non-planar or discontinuous surfaces, and no-contact requirements. This limits the areas where a touch screen can be used on a gaming machine, or other systems requiring such user input.

Additionally, electro-mechanical switches have limitations. Electro-mechanical switches have been used on gaming machines for decades. The number of switches is limited by the size of the mechanical panel. And when the game on the gaming machine is changed, the switches and/or labels must be replaced. Therefore, they are not programmable and must be located in a convenient location for the player to reach.

A primary objective of this invention is to provide another form of user input, such as for a gaming machine, other than using a conventional physical surface or mechanical device. The present system is able to sense a touch on a virtual surface. The virtual surface may be in the middle of the air. The virtual surface may be close to the actual surface, so close it seems that it was a physical touch.

DETAILED DESCRIPTION OF A PREFERRED EMBODIMENT

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is described herein with respect to an interactive game surface device (IGSD) 10, a specific embodiment for use in conjunction with a gaming machine. It should be understood that the present invention is also applicable for use with other systems requiring similar user input.

The IGSD 10 allows any surface, non-conductive or otherwise, to be used for player input. It allows a player to touch an animated figure or a non-planar display in a top box of a gaming device, discussed below. The IGSD 10 also allows the player to use a hand or body movement as an interactive input.

In a first embodiment, the IGSD 10 includes a first sensor module, such as a lower power Doppler radar sensor module 12, and a second sensor module, such as an ultrasonic sensor module 14. Alternatively, and as discussed further below, the IGSD may include only single Doppler radar sensor module, multiple Doppler radar sensor modules, an IR camera, or an infrared/laser scan sensor.

According to Doppler radar theory, a constant frequency signal that is reflected off a moving surface, in this case the skin or clothing of the player, will result in a reflected signal at the same frequency, but with a time varying phase indicative of the relative motion.

In the first embodiment, the Doppler radar sensor module 12 senses movement of all or part of the body via skin or clothing reflections. The Doppler radar sensor module 12 could sense the light movement of the fingers, even the beating of a heart.

With software mapping, the Doppler radar sensor module 12 can sense net amount of motion, mean speed, and average direction for objects in its field of view. With frequency modulation, the Doppler radar sensor module 12 can sense range.

The Doppler radar sensor module 12 must be physically located such that it has a view of the player unobstructed by a surface which is opaque to radar, such as a conductive surface. The center of the field of sensing of the Doppler radar sensor module 12 is usually perpendicular to the orientation of its antenna. The Doppler radar sensor module 12 could be mounted at the side of the gaming machine and aimed so that its field of sensing goes across, or on top of, a surface, which could be metal. The field of sensing would be limited, but this might be desirable for a particular application.

The ultrasonic sensor module 14 utilizes sound energy, or sonar signals, at frequencies of 20 to 100 Kh range. Solid objects reflect this sound energy, and the time difference between transmission and reception indicates range and direction.

Radar signals and sonar signals have different reflective and speed characteristics. Therefore, they are a good combination when dealing with distances between 2-3 cm to 5 meters.

The IGSD 10 also includes an IGSD controller 18, such as a dedicated embedded controller or a standard microprocessor. The IGSD controller 18 provides control, power, interface, and data translation for the Doppler radar and ultrasonic sensor modules 12, 14. The IGSD controller 18 also includes a conventional USB communication channel 20 to a host 24.

Figure 2:
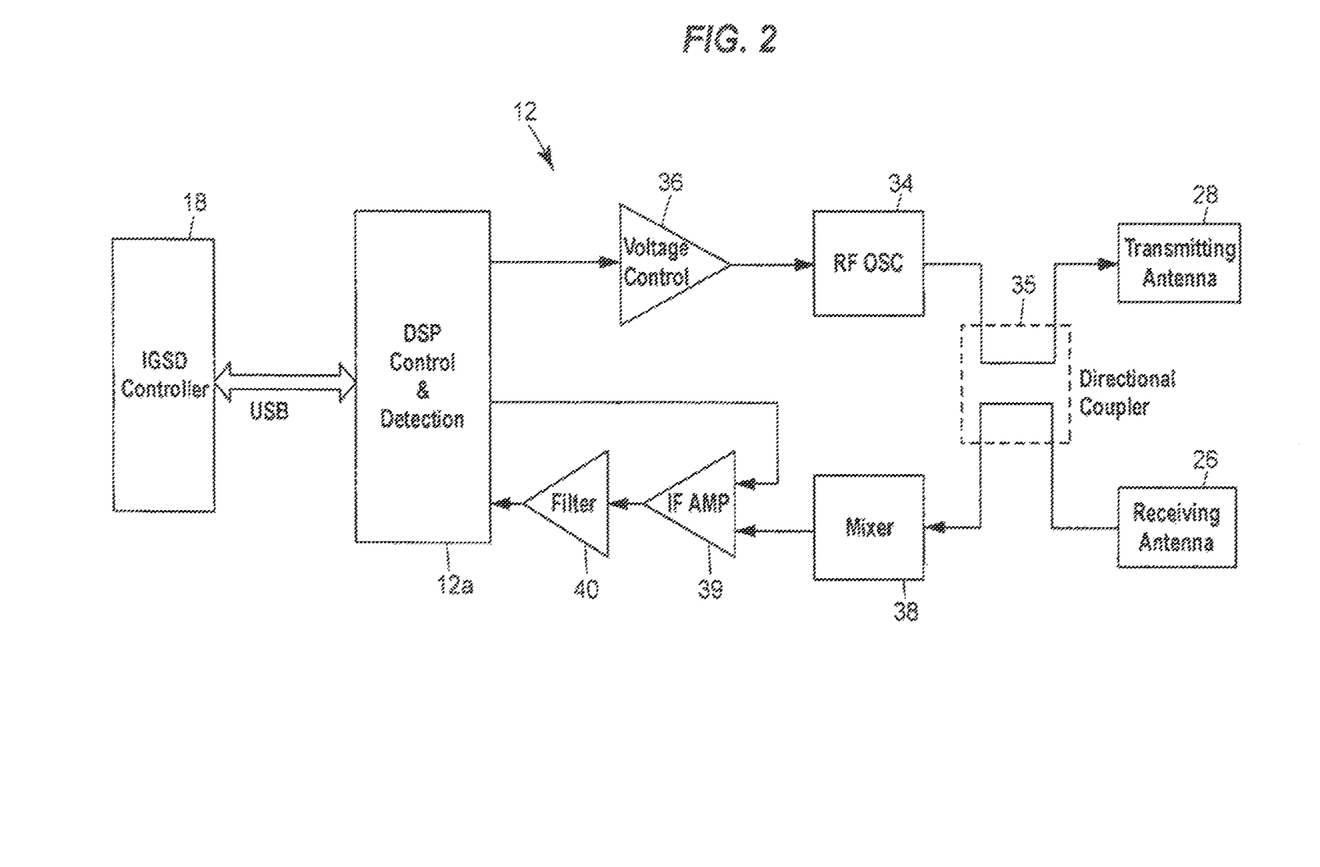
FIG. 2 is a block diagram of a Doppler radar sensor module as utilized by the virtual input system of FIG. 1.

The Doppler radar sensor module 12 uses a low power (<10 mw) 2.45 Ghz microwave sensor. Referring to FIG. 2, the Doppler radar sensor module 12 includes a first micro-patch array 26 as a receiving antenna and a second micro-patch array 28 as a transmitting antenna.

The radar module 12 can be configured for continuous wave (CW) operation or for frequency modulated/continuous wave (FM-CW) operation. The CW configuration provides simple motion detection only. The FM-CW configuration adds range sensing.

The Doppler radar sensor module 12 is provided with a 15 to 20 degree beam-width with a range of 20 to 1 feet. Depending on the location of the antennas 26, 28 of the Doppler radar sensor module 12 within the gaming machine, not only can the Doppler radar sensor module 12 detect objects at the front of the gaming machine, but also hands and fingers touching the surface of the gaming machine.

The Doppler radar sensor module 12 can provide motion and range detection. However when the Doppler radar sensor module 12 is used alone, there can be problems with reflections and noise from multiple sources, such as large groups of people or metal carts in the vicinity of the gaming machine. This potential problem can be minimized or prevented by using multiple radar modules 12, discussed below. However, one can preferably also use ultrasonic sensors on the low side of the electromagnetic frequency spectrum, as also discussed below.

Figure 3:
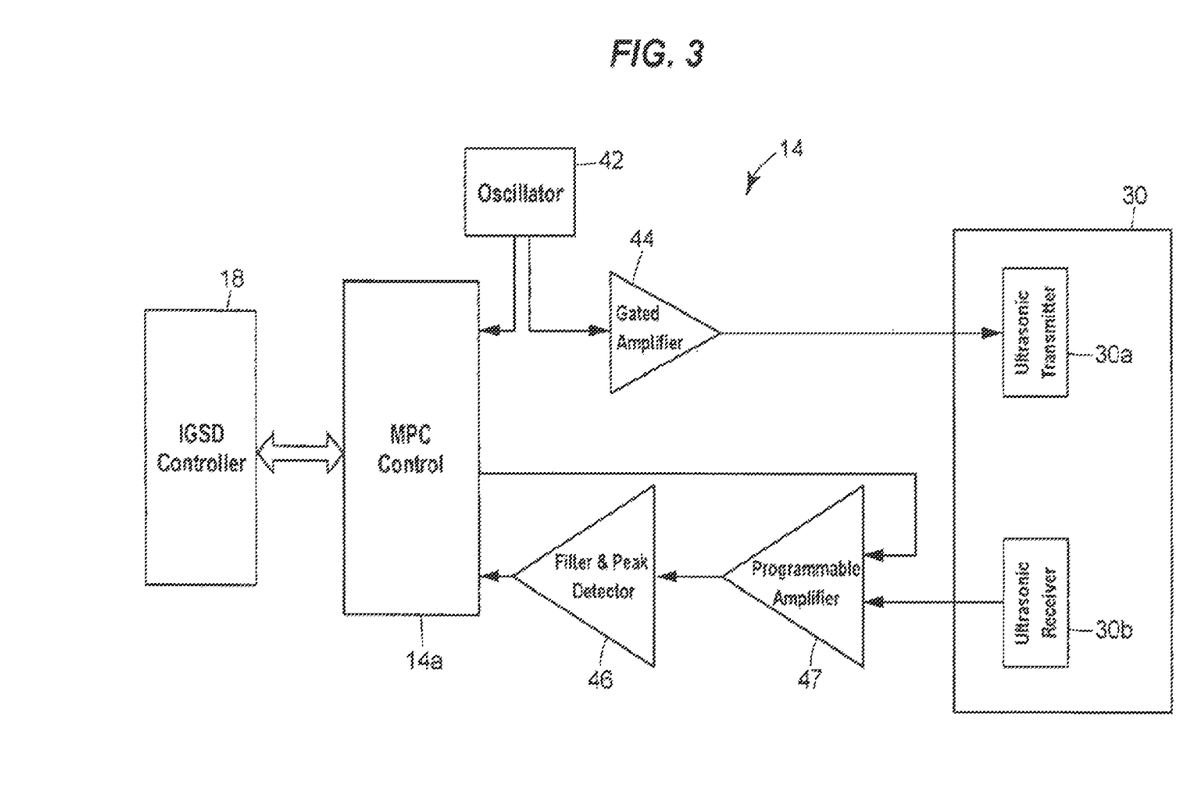
FIG. 3 is a block diagram of an ultrasonic sensor module as utilized by the virtual input system of FIG. 1.

As illustrated in FIG. 3, the ultrasonic sensor module 14 drives several 38-80 kHz ultrasonic transceivers, or sensors, 30. Each of the ultrasonic sensors 30 includes an ultrasonic transmitter 30a and an ultrasonic receiver 30b. The ultrasonic sensors 30 are small, cylindrical sensors which can be installed in various points on the gaming machine. The sensors 30 connect to the rest of the ultrasonic module 14 via cable. Using data processing, the IGSD controller 18 determines the best data image.

Although the IGSD controller 18 preferably includes dual ultrasonic sensors, one sensor can be used, or two of the same type of sensor. Other types of sensors could be used if the application requires such, such as an optical sensor.

Figure 1:
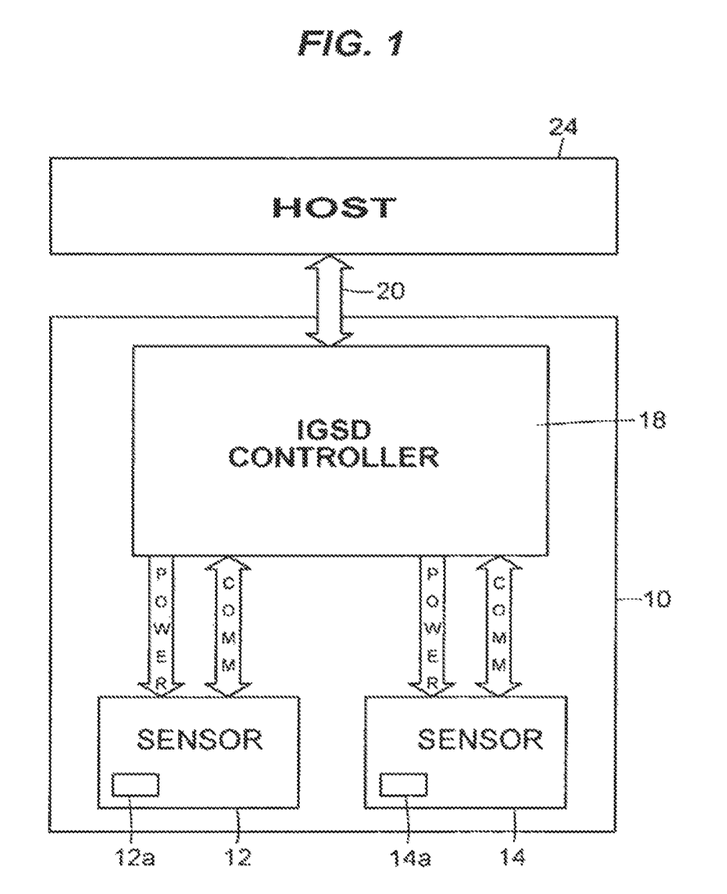
FIG. 1 is a block diagram of a virtual input system according to the present invention.

Referring to FIG. 1, the IGSD controller 18 provides control and data translation. The USB communication interface 20 is provided between the IGSD controller 18 and the host system 24. The host system 24 provides set-up information, which is used by the IGSB controller 18 and the sensor modules 12, 14.

The sensor modules 12, 14 acquire data in the form of sensor images. After data processing, the modules 12, 14 send data streams to the IGSB controller 18. The IGSB controller 18 processes this data, looking for sequences and combinations that match parameters loaded in during a set-up routine. For example, the host system 24 wants the IGSD 10 to perform two functions: 1) provide a people sensor during an attract mode; and 2) provide touch data during bonus mode.

The host system 24 continuously provides mode status to the IGSD 10, which in turn changes the parameters for determining what data, and when data, is sent to the host system 24.

Each of the sensor modules 12, 14, includes a respective processor 12a, 14a. The present system was designed to maximize the workload of the processors 12a, 14a, on each respective sensor module 12, 14, allowing the IGSD controller 18 to handle the integration of both data images from the modules 12, 14. This could be a function of the host system 24 if the processor of the host system 24 could handle the extra workload and use USB communication. This would eliminate the IGSD controller 18, or at least function of the IGSD controller 18.

The Doppler radar sensor module 12 is illustrated in detail in FIG. 2. The Doppler radar sensor module 12 interfaces to the IGSB controller 18 via a conventional USB connection. The processor 12a of the Doppler radar sensor module 12 is a digital signal processor (DSP), such as a Texas Instruments TMS320 series DSP. The radar sensor module 12 uses the radar sensor module processor 12a for control, sampling, filtering and data processing.

The radar sensor module 12 includes an RF Oscillator 34 set for 2.45 Ghz. In the CW mode, this is the frequency of the transmitting signal. In the FM-CW mode, a voltage controlled oscillator (VCO) 36 provides a frequency control voltage to the RF Oscillator 34. The output of the RF oscillator 34 drives the transmitting antenna 28 via a directional coupler 35. The signal is coupled to the receiving input, which is mixed by a mixer 38 with the signal from the receiving antenna 26. The output of the mixer 38 is an IF frequency signal, which is the difference of the transmitted and received signals.

In the CW mode, the IF frequency signal relates to the relative velocity of the object. In the FM-CW mode, the IF frequency signal relates to the distance due to function of time. The IF frequency signal is amplified by a programmable IF amplifier 39 and fed to a filter circuit 40, which helps remove noise. The output of the filter circuit 40 is connected to an A/D input of the radar module processor 12a. The radar module processor 12a processes the signal, using peak detection, digital filtering, and measurements, providing a digital image. If the digital image meets certain parameters, depending on the set-up, the radar module processor 12a could send a complete data stream or just a message.

It should be understood that other radar designs would work. A frequency of 2.45 Ghz is used here because it is in the ISM frequency band, an unlicensed range. However as a result, power output is limited (~20 dbm) due to FCC rules. There could be other frequencies that would operate with more accuracy.

A 4×4 array is used for the micro-strip patch array antennas 26, 28 of the present embodiment. The 4×4 array is formed of 16 small squares connected together. PCB cladding material is used as part of the layout. The antenna array mandates the sensor be mounted behind a non-conductive surface. Depending on the frequency, the antenna array will change in type and size. Using an array of 4"×4", or smaller, one can place the array in a plastic structure or behind a glass panel. Commercially specialized antennas are available which are designed for specific beam patterns. Other optimal antenna configurations are possible, such as phased antennas, different sized arrays or a helical configuration for narrow beam width. With increased sensitivity and increased data processing, one could sense the vital signs of people standing in front of the machine.

Referring to FIG. 3, ultrasonic sensors operate in the basic mode of transmitting a burst of ultrasonic frequency, and then waiting a certain period of time. Following this period of time, a reflected signal, or echo, of the pulse previously transmitted is received. As is well known, the time between transmission and reception is proportional to the object's distance. Depending on the sensor device, the beam width can be adapted to the application. Using multiple sensor devices and angulation processing improves resolution and accuracy.

The processor 14a of the ultrasonic module 14 is a microprocessor controller (MPC) 14a, such as a Philips Semiconductors P8051. The processor 14a controls operation of the sensor devices and interfaces to the IGSD controller 18 via a conventional USB communications link.

The processor 14a is connected to an ultrasonic sensor 30. However, the processor 14a could control multiple ultrasonic sensors 30. The limitation is the number of I/O lines on the processor 14a, and cost. An oscillator 42 oscillates at a frequency set for 38 kHz, matching the sensor specification. The oscillator 42 has two outputs; one is 38 kHz (digital) for the processor 14a, and the other is a 38 kHz (sin wave) for the transmitters. A gated amplifier 44 controls the length of the burst, plus provide a high voltage output for the transmitter 30a. The processor 14a provides control. If multiple sensors 30 are utilized, it is important to gate each ultrasonic transmitter to turn on one at a time, especially if multiple receivers will detect the reflected signal.

Although the beam width for the transmitter is narrow, >10 degrees, and the range is short (5 ft to 2 in), the reflections can be multi-directional depending on the object. All 38 kHz signals are ignored beyond an established time limit. These signals could be reflecting off an object greater than 5 ft or caused by a nearby noise source. A combination filter/peak detector 46 eliminates unwanted frequencies and converts the AC signal into a digital signal for the ultrasonic module controller 14a.

Data processing by the ultrasonic module controller 14a provides data analysis, comparing the 38 kHz signal from the oscillator 42 to the received signal in order to determine range and direction. If there are multiple ultrasonic sensors 30, the ultrasonic module controller 14a performs various triangulation computations for increased accuracy. The ultrasonic sensor module controller 14a then sends a data image to the IGSD controller 18.

There are different circuits and types of ultrasonic sensors that could alternately be used. The 38 kHz sensor is used here because such sensors are very available. However, higher frequencies could be better for using the Doppler effect for detecting moving objects.

Both the Doppler radar sensor module 12 and the ultrasonic sensor module 14 are plagued by unwanted reflections. Accordingly, circuitry is provided to set the receive sensitivity of both the modules 12, 14.

The Doppler radar sensor module 12 works better by first adjusting to its environment, so the programmable IF amplifier 39 is utilized. The radar sensor processor 12a is coupled to the programmable IF amplifier 39. This provides a 4-level (2 bits binary) programmable control for the programmable IF amplifier 39.

Referring again to FIG. 3, the programmable Ultrasonic receiver 30b The ultrasonic sensor processor 14a is coupled to a programmable amplifier 47 located between the filter/peak detector and the receiver 30b. The programmable amplifier 47 is also coupled to the processor 14a, and has eight (3 bits) levels of sensitivity. The programmable amplifies 47 adjusts the sensitivity of the filter/peak detector 46. When the IGSD 10 is turned on, or goes through a reset, the IGSD controller 18 sends out a control signal to the programmable amplifies 47 to adjust the receiver 30 b for optimal sensitivity.

Optimal sensitivity is achieved by adjusting the respective received signal, measuring any reflections, and then readjusting and repeating. This continues until optimized, under control of the IGSD controller 18, because it's important to limit only unwanted reflections, not true ones.

After setting optimal operating parameters, if multiple ultrasonic sensors 30 are utilized, the sensors 30 cooperate, using their programmable capabilities. As the reflections move closer to the machine, the ultrasonic sensors 30 are given the command to reduce sensitivities, removing background reflections. There could be cases when one wants the sensors to adjust for maximum sensitivity.

According to a second embodiment, a second Doppler radar sensor modules 12 is utilized instead of the ultrasonic sensor module 14. Using two Doppler radar sensor modules 12 provides greater flexibility in design. A Doppler radar sensor will not work behind conducting surfaces, such as steel, aluminum, and the like, and the location is important to sense direction of motion. But with two Doppler radar sensors, one can physically locate them in two different areas with overlapping fields of scan where one wants the player to touch. It allows the object to stay in view of both, or at least one, sensor at any time, resulting in no blind spots. Plus, it provides a three dimensional field of view in certain areas, providing a greater detection of other hand movements that could be used for other than playing the machine. For example, one could request a drink by making a particular hand gesture, and the machine will send a signal to the bar ordering the drink. Although this configuration improves accuracy, the cost is higher.

Configuration of the Doppler radar sensor module 12 and the ultrasonic sensor module 14 is as follows. Once set for optimal, both sensors 12, 14 must report an object in the field of sensing to start the process. If one or both sensors 12, 14 report an object getting closer, the ultrasonic sensor module 14 reduces its output to check. With more control over the ultrasonic sensor module 14, one can reduce the number of reflections because the distance the signal can be received from the source has been limited per the square law rule. If a valid reflection is sensed, the Doppler and ultrasonic sensor modules 12, 14 re-adjust and then re-verify. This repeats until the object is in front of the gaming machine by a player distance. To maximize people interaction with the machine, one could use different attract visuals and sound depending on the distance of the object sensed. Absent software analysis of the motion of the detected object, the IGSD 10 does not know whether it has detected a human, or whether it has detected some other object, such as a vacuum cleaner. With both sensor modules 12, 14 verifying each other, accuracy is improved.

Once there's an action to begin play of the machine, such as by insertion of a coin, the IGSD 10 knows it has detected a human. The application sends commands to the Doppler radar sensor module 12 via the controller to change the transmitting and receiving parameters to focus on the area between the player and the touch area. If the touch area is very close to the sensor modules 12, 14, the ultrasonic sensor module 14 is used to sense the touch, but the Doppler radar sensor module has already notified the IGSD controller 18 that a hand or arm is approaching.

Figure 4A:
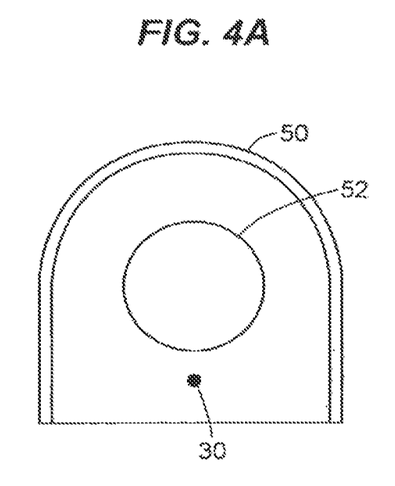
FIGS. 4a and 4b are respective front and side views of a gaming machine top box which utilizes the virtual input system of FIG. 1.
Figure 4B:
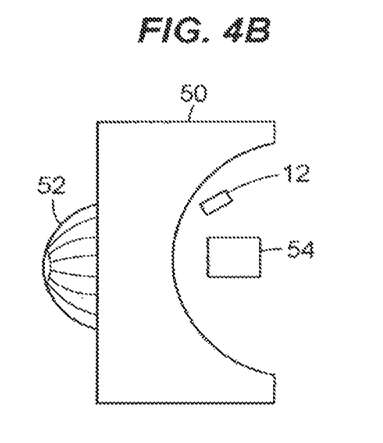
Figure 5:
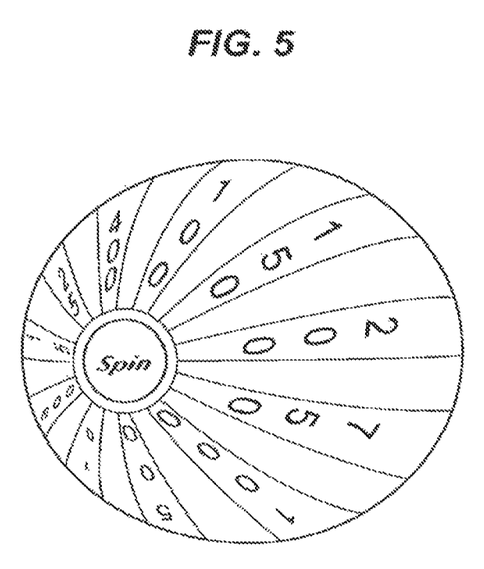
FIG. 5 is a view of a hemispherical display of the top box of FIGS. 4a and 4b.

A top-box 50 is illustrated in FIGS. 4a and 4b. The top-box 50 is a mechanical structure located above a main cabinet or main game area of a gaming machine (not shown). Top-box designs are used for player attraction and bonus game play, as are well known. There are many types of images displayed on top-boxes, such as spinning wheels, rotating reels, mechanically animated devices or other displays. Some top-box displays have a non-planar shape, such as a hemispherically formed screen 52. In one example, as illustrated in FIG. 5, the image spins or rotates as part of a bonus game. The player can cause the image to stop by touching the image, or extending the player's arm toward the image, but not making actual contact with the actual image.

According to the present invention; the Doppler radar sensor module 12 is located above a video projection unit 54 inside the top-box 50. Because the surface of the screen 52 is made of rear projection material, the screen 52 has a clear field of view towards the player. The ultrasonic sensors 30 are installed around the bottom of the display and provide additional coverage if the Doppler radar sensor module 12 has a so-called dead spot near the edges of the screen 52.

Other top-box designs can be in the form of mechanical doors. The player points to one of the doors and/or touches the door; which opens to reveal the amount of the bonus. In this top-box design, the Doppler radar antennas are mounted above the top-box doors, and a respective one of the ultrasonic sensors 30 is located next to each door. The host system 24 notifies the IGSD controller 18 that the game is in a bonus mode. The IGSD controller 18 begins to monitor and translate the data streams from the sensor modules 12, 14. In this example, the doors are too far from the player, so the player is required to point to the door. Data from Doppler radar sensor module 12 shows motion and a set direction. The ultrasonic sensor module 14 shows position and a set direction. Triangulation confirms the angle and set direction. Motion stop and data is verified. The IGSD controller 18 sends the result to the host controller 24.

Typically gaming machines have a silk-screened glass panel below the main play area called the belly glass. Some gaming machines have another one above the main play area called the top glass. Because these glass panels typically go through a silk-screen process, it would be very difficult to use it as a touch-sensor, especially if these touch-sensor/glass panels required a wired connection. This would result in the disconnecting and connecting of the glass panels every time the machine is accessed for troubleshooting or the glass panel is replaced. Using the IGSD 10 of the present invention, no direct connection to the glass panel is required. The Doppler radar sensor module 12 is placed behind the glass panel, and one is able to use the glass panel as a player input.

Another use of the IGSD 10 is for player attraction. Gaming machines use a combination of visuals and sounds to attract players to the machines. With the IGSD 10, one can have a dynamic attraction. The IGSD 10 can sense people walking by the gaming machine, or stopping to look. This in turn can cause a change in the visuals and sounds, attracting a possible player. Sensing the position and direction, the gaming machine would again change the visuals and sounds as the person nears the machine. Gender can be determined, which enables a different set of visuals and sounds.

In a third embodiment, only a single Doppler radar sensor module 12 is utilized, no ultrasonic, or other sensor. The single Doppler radar sensor module 12 can detect any object in its field of sensing, moving or range and motion, depending on microwave type. The single Doppler radar sensor module 12 will sense motion, speed and direction as an object approaches the machine. It could be used as an object sensor, which would be used to change attract modes. It is unable to distinguish a human from an inanimate object, unless the sensor has the sensitivity, and the IGSD controller 18 has the computing power, to be able to detect heartbeat by sensing the blood flow in the arm or hand, but, such would be a relatively complex configuration.

For example a top box display could respond to the approaching object, with a welcome screen or a preview of a bonus play. The only way to verify the object is a player is to use the attract mode changes, but wait until the host 24 detects the start of a game, such as upon insertion of a coin, before using it as a touch sensor. The disadvantage of the simple configuration compared to configurations with multiple sensors is the possibility of blind area. These are areas within the field of sensing that motion detection can be easily blocked, so the location of the sensor is important. Also, the touch area cannot be to close to the sensor because the Doppler radar sensor module 12 typically cannot detect close objects, such as those within 1 ft. The main advantage of this simple configuration is the cost and the size of the sensor module.

Figure 6:
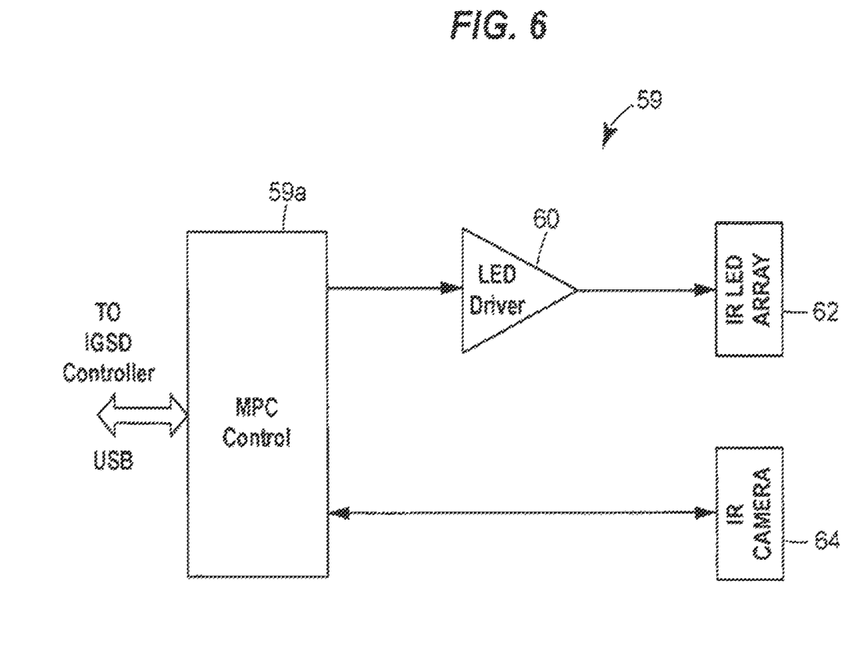
FIG. 6 is a block diagram of an IR camera sensor according to the present invention.

An embodiment utilizing an IR camera sensor 59 is illustrated in FIG. 6. The IR camera sensor 59 includes an IR camera sensor processor 59a coupled via an LED driver 60 to an IR emitter array 62. The IR camera sensor 59 further includes an IR camera 64, also coupled to the IR camera sensor processor 59a. The most common configuration of the LED emitter array 62 is a circle of LEDS around the lens of the IR camera 64. The IR camera 64 has several manual or programmable features, such as focus, sensitivity, and the like. An application program in the IR camera sensor processor 59a provides noise filtering, gray level conversion, and detection.

The IR emitter array 62 floods the area around the machine with infrared light. To a human, this light is invisible, but not to the IR camera 64. The human eye acts like a mirror to the IR wavelength. When looking at the machine, the IR light reflects off the retina of the eye, and the lens of the eye focuses this reflected light towards the IR camera 64. The IR camera 64, being sensitive to IR light, will sense reflected light, and the IGSD controller 18 can determine, via software application, if the received IR light is actually an eye reflection.

The IR camera 64 can also be used to detect motion, using angular processing as reflections move. However, it cannot accurately determine distance. The IR camera sensor 59 would appear as another device connected to the IGSD controller 18. The IR camera sensor 59 would be used in conjunction with any of the above described systems.

Figure 7:
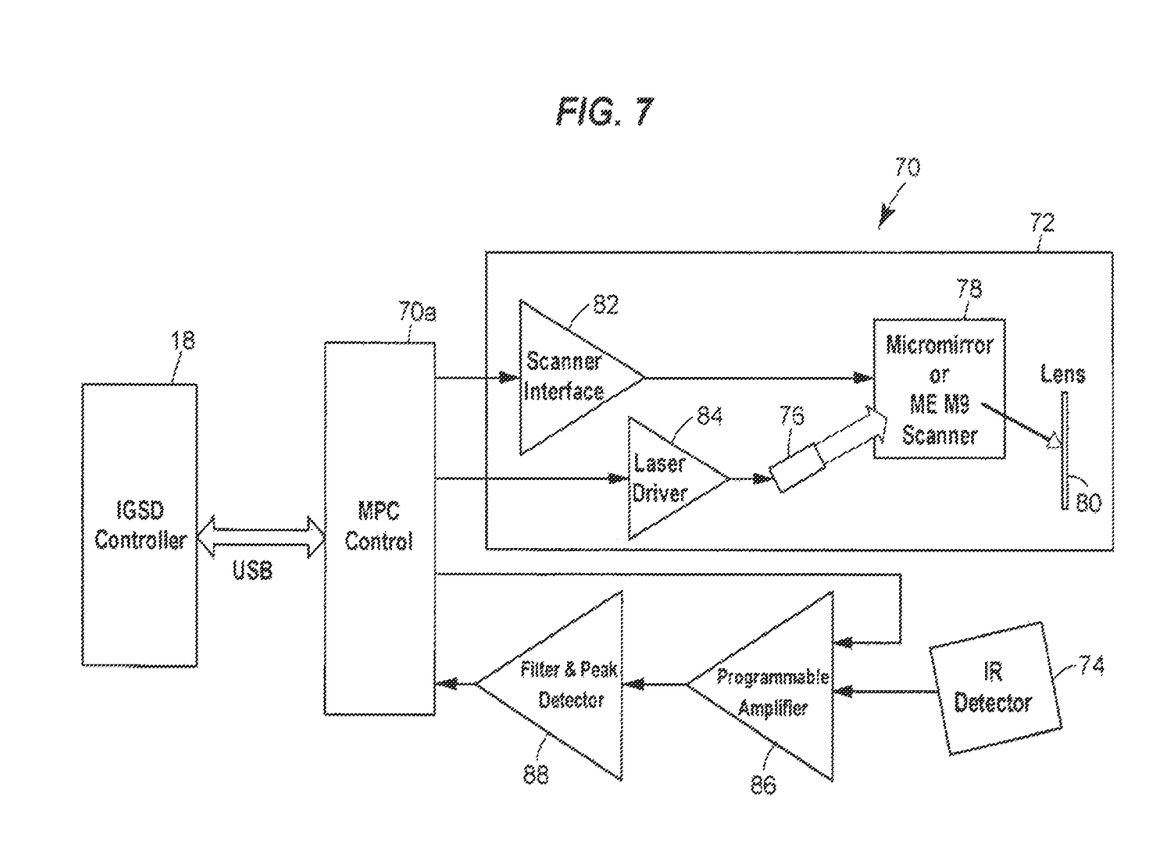
FIG. 7 is a block diagram of an IR/laser scanning sensor, according to the invention.

Alternatively, a standard camera, also designated 64, can be utilized to detect human form. All of this is to determine if the object detected for motion is actually a human player, rather than some inanimate device A final embodiment utilizing an infrared laser scan sensor 70 is illustrated in FIG. 7. The infrared laser scan sensor 70 is preferably utilized in conjunction with the ultrasonic sensor 30, discussed above. The infrared laser scan sensor 70 is capable of being mounted in small areas. It can be mounted behind metallic surfaces, although it would require a small opening in the surface. The opening could be covered with plastic or glass, provided the covering is not opaque to the infra red light.

The infrared laser scan sensor comprises an infrared projector 72 and an infrared detector 74. The infrared projector 72 comprises: (1) an IR or red laser 76; (2) a reflector device 78, such as a digital micro-mirror device (DMD), as provided by Texas Instruments, or a MEMS (Micro-Electrical mechanical system) scanner; and (3) a lens 80. The projector 72 further includes a scanner interface 82 and a laser driver 84. The scanner interface 82 can be digital drivers, or a DAC, depending on the type of reflector device 78. The laser module 76 can be continuous, pulsed or modulated, all under control of the processor 70a.

The reflective device 78 is extremely small, and requires a narrow beam. The lens 80 assures the light beam covers the entire surface to be scanned.

The infrared projector 72 beams light into a prismatoid shaped pattern in front of the sensor opening. As is known in the art, the DMD and MEMS use mechanical action to sequentially reflect light from an X-Y array of reflectors under control of the processor 70*a*. The reflector located in the upper left corner is first activated, sending the reflected beam out toward a first point in space. Then the next reflector is activated, sending the reflected beam toward a second, adjacent point in space. This continues until each reflector has been activated, at which time the process is repeated.

The high rate of switching between individual reflectors of the reflector device 78 causes a laser beam to be reflected in an X-Y pattern through the lens, forming a prismatoid field of sensing. A physical object is in this field is be scanned by the laser. The infrared detector 74 is coupled to the processor 70*a* by a programmable amplifier 86 and a filter/peak detector 88. The detector 74 detects the reflection of the laser spot (beam) off of the object, generating an output trigger signal. This trigger signal with information identifying the particular reflector activated at that time indicates the location of the illuminated point of the object. The IR detector 78 has a wide field of sensing, and a programmable amplifier 86, under control of the processor, adjusts the output of the detector 78.

A hand in the field of scanning could generate hundreds of triggers and each trigger will appear at different X-Y locations. The IGSD 10, or the host 24 would use angular processing providing motion detection and location, but referencing these as if they were on a single plane of the three dimensional space. Accordingly, the ultrasonic sensor 30 would work in conjunction with the infrared laser sensor 70.

Relative position is determined by using the X-Y coordinates as a reflected signal is detected. Motion can be determined be comparing the relative changes in the reflected signals or by using the Doppler effect. One feature of the laser scan sensor 70 is its ability to outline objects in the field of sensing, such as to distinguish a human outline from that of a cart. The laser scan sensor 70 can also determine the number of people standing in front of the machine. This feature can be used for very interesting attract modes.

Alternatively, an IR camera system could be used to detect the X-Y location of the reflected beam and then use the next set of scans to determine angular movement, although this would be more complex.

The beam scan gets larger further away from the source, like an inverted pyramid. When the ultrasonic sensor detects the object is in the virtual touch area, and the infrared laser scan sensor sends the correct X-Y coordinate, the system determines the touch is valid.

While the specific embodiment has been illustrated and described, numerous modifications come to mind without significantly departing from the spirit of the invention, and the scope of protection is only limited by the scope of the accompanying claims.

The invention is claimed as follows:

1. A device comprising:
   an electromagnetic sensor module configured to determine a location of a user input at a virtual input location;
   a camera configured to detect motion at the virtual input location; and
   a controller coupled to the electromagnetic sensor and the camera, wherein the controller is configured to determine whether a portion of the user input is within the virtual input location in a space that defines a virtual input.

2. The device of claim 1, wherein the controller is configured to generate an output signal indicating an actuation of the virtual input in response to determining that the portion of the user input is within the virtual input location in the space that defines the virtual input.

3. The device of claim 1, wherein the electromagnetic sensor module comprises a Doppler radar sensor.

4. The device of claim 3, wherein the Doppler radar sensor comprises at least two micro-patch arrays.

5. The device of claim 4, wherein a first micro-patch array is configured to operate as a transmitting antenna and a second micro-patch array is configured to operate as a receiving antenna.

6. The device of claim 3, wherein the Doppler radar sensor is configured to operate using a frequency modulated/continuous wave operation.

7. The device of claim 3, wherein the Doppler radar sensor has a beam width between about 15 degrees and about 20 degrees.

8. The device of claim 1, wherein the camera comprises an infrared emitter and an infrared camera.

9. The device of claim 1, wherein the camera comprises a visible light camera.

10. The device of claim 1, further comprising:
    a surface, wherein the space that defines the virtual input is defined substantially on the surface.

11. The device of claim 10, wherein the surface comprises an image indicating the space that defines the virtual input.

12. The device of claim 11, further comprising:
    a projector configured to project the image on the surface.

13. The device of claim 12, wherein the projector is configured to project the image as moving on the surface.

14. The device of claim 10, wherein the surface is non-planar.

15. A method comprising:
    determining, by an electromagnetic sensor module, a location of a user input at a virtual input location;
    detecting, by a camera, motion at the virtual input location; and
    determining, by a controller coupled to the electromagnetic sensor module and the camera, whether a portion of the user input is within the virtual input location in a space that defines a virtual input.

16. The method of claim 15, further comprising:
    generating, by the controller, an output signal indicating an actuation of the virtual input in response to determining that the portion of the user input is within the virtual input location in the space that defines the virtual input.

17. The method of claim 15, wherein the space that defines the virtual input is defined substantially on a surface, and wherein the surface is at least one of a planar surface or a non-planar surface.

18. A system comprising:
    means for sensing a location of a user input at a virtual input location;
    means for detecting motion at the virtual input location; and
    means for determining whether a portion of the user input is within the virtual input location in a space that defines a virtual input, wherein the means for determining is coupled to the means for sensing and the means for detecting.

19. The system of claim 18, wherein the means for determining comprises:
    means for generating an output signal indicating an actuation of the virtual input in response to determining that the portion of the user input is within the virtual input location in the space that defines the virtual input.

20. The system of claim 18, wherein the space that defines the virtual input is defined substantially on a surface, and wherein the surface is at least one of a planar surface or a non-planar surface.

\* \* \* \* \*